Dec. 3, 1968 B. LONG 3,414,464
FLAT GLASS AND METHOD AND APPARATUS FOR MAKING FLAT GLASS
Filed Dec. 8, 1964 2 Sheets-Sheet 1

INVENTOR.
BERNARD LONG
BY *Bauer and Seymour*
ATTORNEYS

Dec. 3, 1968  B. LONG  3,414,464
FLAT GLASS AND METHOD AND APPARATUS FOR MAKING FLAT GLASS
Filed Dec. 2, 1964  2 Sheets-Sheet 2

INVENTOR.
BERNARD LONG
BY Bauer and Seymour
ATTORNEYS

United States Patent Office 3,414,464
Patented Dec. 3, 1968

3,414,464
FLAT GLASS AND METHOD AND APPARATUS
FOR MAKING FLAT GLASS
Bernard Long, 63 Rue de Rome, Paris 8eme, France
Filed Dec. 8, 1964, Ser. No. 416,710
Claims priority, application France, Dec. 13, 1963,
957,200; Oct. 27, 1964, 992,898
14 Claims. (Cl. 161—192)

This invention relates to the manufacture of flat glass. The term flat glass is a term of art which includes not only sheets which are plane but sheets which have curvature. This invention is an improvement over that which is described in my copending application, Ser. No. 407,023, which describes a process of making flat glass to its final dimensions which comprises pouring within a mold wall of material not wetted by glass onto a flat surface of material not wetted by glass a quantity of glass which will cover the area within the wall at equilibrium, maintaining the fluidity of the glass until it has reached equilibrium and has formed a sheet, and cooling the glass, as well as modifications of the process and apparatus by which the process can be carried out. The apparatus of FIGURE 2 of that application can be used with some modification in the present invention. That application also describes a novel product, a sheet of glass of equilibrium thickness which has rounded fire-polished edges and plane fire-polished surfaces joining the edges. By equilibrium thickness is meant a sheet of glass which has been poured upon a flat surface at liquid temperature and has been allowed to subside under the forces of gravity and surface tension until it has attained stable thickness, which is generally about 6 to 6.5 mm.

It is an object of the invention to make flat glass to final dimensions with fire-polished aspect requiring no trimmings and no grinding and polishing. Another object is to extend the invention of my application, Ser. No. 407,023, to sheets of less than equilibrium thickness. Another object is to temper such sheets when tempering is desirable, and to do so without reheating the glass to its softening point, the reheating step being an integral part of tempering as previously practiced. Another object is to fire polish flat glass in a solid mold and to use a liquid flotation bath for the correction of surface defects, if such exist. Another object is to correct surface defects at temperatures previously deemed inadequate to such use. Another object is to provide apparatus of novel design for the accomplishment of the method. Other objects will appear as the description proceeds.

The above and further objects and novel features of the present invention will more fully appear from the following detailed description when the same is read in connection with the accompanying drawings. It is to be expressly understood, however, that the drawings are for the purpose of illustration only and are not intended as a definition of the limits of the invention, reference for this latter purpose being had primarily to the appended claims.

In the drawings, wherein like reference characters refer to like parts throughout the several views, FIG. 1 is a vertical sectional view through a mold during the accomplishment of the process of the present invention;

Figure 2:
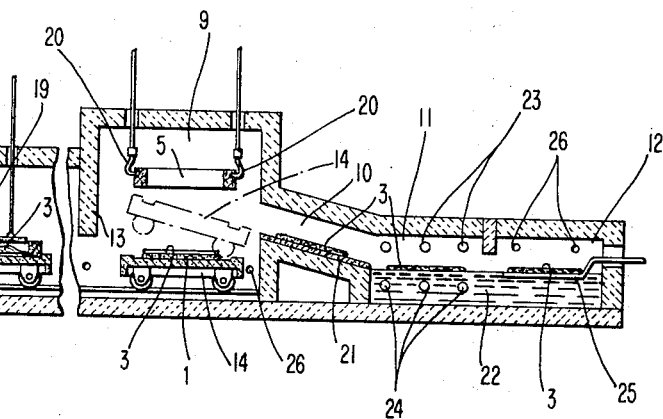
FIG. 2 is a vertical longitudinal sectional view of an apparatus adapted to the accomplishment of the present invention.

Referring to FIG. 2, which is quite similar to the apparatus employed in the identified case, it can be seen that the plant includes a thermal tunnel comprising a compartment 7 wherein the molten glass is poured in the mold; a compartment 8 wherein the previously obtained liquid molten glass is shaped under a mold cover 19; a compartment 9 wherein the carrier is tipped up after the mold frame has been removed; a compartment 10 including an inclined graphite plate on which the glass sheet slides from the mold bottom to the molten metal bath; a compartment 11 wherein the glass sheet is kept stationary for a certain time in a softened condition while resting on the molten metal bath; and a compartment 12 wherein the glass sheet is cooled before it is transferred to the annealing oven.

When the mold is in compartments 7, 8, 9, which are separated by masonry partitions 13, the mold includes a mold bottom part 1 and a graphite frame 5 supported on carrier 14. Carrier 14, rolling on rails 15, is moved in sequence from compartment 7 to compartment 8 and to compartment 9, and is returned back to compartment 7. When mold 1 is in compartment 7, which is heated by resistors 16, a volume 17 of liquid glass is poured therein by ladle 18, said ladle having a predetermined capacity, and being internally coated with graphite, so as to obtain a complete draining off of the liquid glass therein contained. In compartment 8, the uniform layer of liquid glass formed in mold 1 is shaped by the graphite plate 19. In compartment 9, the frame 5 of mold 1 is raised by hooks 20 engaged in lateral recesses.

The glass sheet 3, in a plastic condition, is free to slide and after carrier 14 has been tipped up by devices not shown, to bring it to the position shown by dotted lines, it slides onto the inclined graphite plate 21 then into compartment 11, on the surface of molten tin bath 22, which is heated by resistors 23, located over bath 22, as well as by resistors 24 inside the tin bath.

In compartment 12, the glass sheet 3 is suitably cooled off before it is transported on a bent fork 25 to an annealing oven (not shown).

Various tubes 26, positioned along the above described production line, feed pure nitrogen or a mixture of nitrogen and hydrogen to maintain a nonoxidizing atmosphere in the various compartments. Various changes in this apparatus, to adapt it to different purposes will be described hereinafter.

The present invention relates to glass sheets which are obtained by shaping liquid glass inside molds so that their faces possess level surfaces and fire polish and so that their borders are fire-polished and rounded. In the identified case the minimum thickness of the sheets is about 6 mm., for ordinary window glass compositions, but this is not satisfactory for a number of important applications which require thicknesses less than 6 mm. For example, in making glass sheets for the manufacture of safety sandwich glass a thickness of about 3 mm. is preferred. An object of the present invention is to manufacture such thin sheets of molding liquid glass, the thickness being substantially less than equilibrium thickness. The present invention produces sheets, fire-polished and with rounded edges, of thickness between about 2 and about 6 mm.

This invention is accomplished by, so to speak, modifying the earlier invention by imposing upon the upper surface of the volume of liquid glass a weight which is uniformly distributed over its surface as soon as the lateral extension of the glass has ended, and which is of sufficient weight to compress the glass to the desired thickness. In a mold having the interior horizontal shape desired, it is easy to obtain, by preliminary trials, that exact charge of liquid glass which is to be poured into the mold and which will exactly fit the walls of the mold to the desired thickness under the weight of the mold cover which is imposed. A simple method of filling the mold involves applying a graphite plate over the mass of liquid glass in the mold as soon as it has been poured, the plate being of a material which is not wetted by the glass, which is plane, of constant thickness and which has an exterior contour which fits the interior of the mold wall and permits it to move therein. The bottom of the mold and the mold wall are also of material not wetted by the glass. Such material is noncapillary to glass. In ordinary use carbon will be employed, preferably graphite, which is extremely satisfactory as long as oxygen is excluded from the enclosure. One thus obtains a relation between the volume of the glass to be admitted to the mold and the weight required to expand the glass laterally until it completely covers the bottom of the mold and just lightly touches the wall.

The thickness of the shaped sheet of glass is related to the charge as approximately the quotient of the volume of glass divided by the area of the bottom of the mold. From the thickness of the liquid glass molded, one passes easily to the thickness of the sheet after cooling and solidification. In practice, the difference between these two thicknesses, before and after cooling, is generally negligible.

The present process involves steps which can be followed on FIG. 2 of the drawings: the furnace having been filled with a nonoxidizing atmosphere, a ladle 18 pours into the mold 5 exactly that quantity of glass which is to be formed into a sheet, the volume of the liquid glass being equal to the product of the area of the mold by the thickness of the sheet desired. The carriage 14 is moved into the next compartment of the furnace where the graphite plate 19 is lowered upon the glass and the rods which support the plate are withdrawn or not, as the case may be. In one method of carrying out the invention, the rods apply to the plate exactly that degree of light pressure which produces a sheet of the chosen thickness, for example 3 mm., and as soon as that thickness has been produced the glass is cooled to a plastic condition, the plate is lifted off by the rods, and the mold is moved into the next chamber of the furnace where it is removed and the sheet is transferred to the surface of a bath of molten metal on which any surface imperfections disappear and handling by ordinary handling means becomes possible. Within the mold the sheet, at its selected thickness, has rounded edges of which the greatest dimension is in contact with the whole surface of the mold wall. Thus, the sheet produced is of uniform thickness and of the same size and shape as the wall of the mold. This process thus contains two fundamental operations, the molding of a selected volume of liquid glass to a sheet of selected thickness of shape and dimensions predetermined, and with rounded edges by the use of graphite, surface tension, and a weight of selected magnitude which is uniformly disposed over the whole surface of the glass; and the elimination of defects of surface, if such exist, from the faces of the molded sheet by maintaining it in a plastic state for a few seconds on the surface of a bath of molten metal.

At this point, it is desirable to indicate what is meant by liquid and plastic glass. Liquid glass has a viscosity of between about $10^{2.5}$ and $10^{4.5}$ poises within which the range of $10^{3.2}$ and $10^{3.75}$ poises is preferred. For ordinary glass of the type used in window glass, the corresponding temperatures are between 1300 and 1000 and between 1200 and 1100° C. By plastic glass is meant a glass which has a viscosity between about $10^{6.5}$ and $10^{9.5}$ poises the corresponding temperatures for which, for ordinary glass, are between 800 and 65% C. The viscosity at which surface defects and irregularities of levelness disappear is between about $10^{6.5}$ and $10^{8.5}$ poises, which for ordinary glass is between about 700 and 800° C. It is astonishing that it is possible to obtain this result at the relatively low temperatures of 700 to 800° C. and this permits one to remedy any defects occasioned by molding in contact with graphite surfaces, but it must also be noted that the molding when thus carried out produces an astonishingly small number of such defects, a phenomenon which is not completely explained by the rapidity with which the glass has hardened or the lightness of the pressure applied by the graphite plate.

Figure 1:
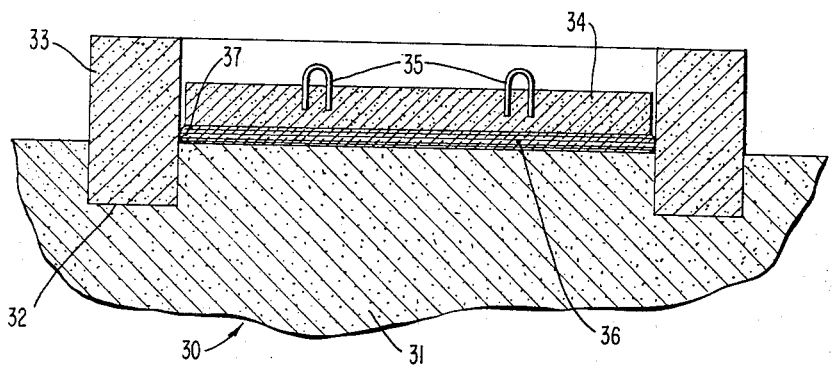

The simplest form of the invention is illustrated in FIG. 1 in which a graphite mold 30 is provided with a base 31 in which is an annular depression 32 which receives an annular carbon ring 33 which is removable and constitutes the wall of the mold. A loose plate 34 fits the mold in shape and is just enough smaller than the inner circumference of wall 33 to allow it to be moved freely upward. Rings 35 allow it to be lifted by tongs, not shown, operable from outside the enclosure, the mold being positioned as in the first compartment of FIG. 2. Enough glass is poured in by the ladle to form a layer 36 of chosen thickness when fully expanded laterally under the weight of the mold top 34. The sheet having been formed to uniform dimensions is provided at its rim with a rounded edge 37 which will just touch the circumferential wall of the mold.

The sheet having thus been formed from liquid glass, the temperature is brought to that of plastic glass and the sheet is removed, as indicated in FIG. 2, and transferred for a few seconds to the surface of a metal bath in a nonoxidizing atmosphere. The temperature of the bath is sufficient to keep the surfaces of the sheet in a plastic state and the sheet may be allowed to remain there until any imperfections have been levelled off. The sheet is then moved into the final compartment, which is below the deformation point ($10^{11}$ to $10^{12}$ poises) and the glass is removed and further treated as desired, for example, by annealing.

The layer of liquid glass is rapidly transformed to a plastic sheet inside the mold by sharply cooling the cover plate and, if need be, the bottom of the mold. Any number of cooling means may be used for this purpose. In general, it is sufficient to cool the cover plate by radiation by a water box which can be lowered into proximity for a few seconds.

Figure 3:
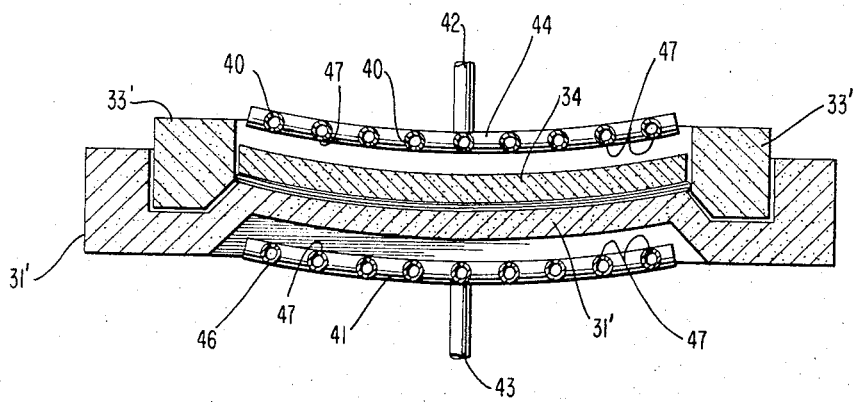
FIG. 3 is a vertical sectional view of a mold adapted to simultaneous formation of curved sheets and the tempering thereof.
Figure 4:
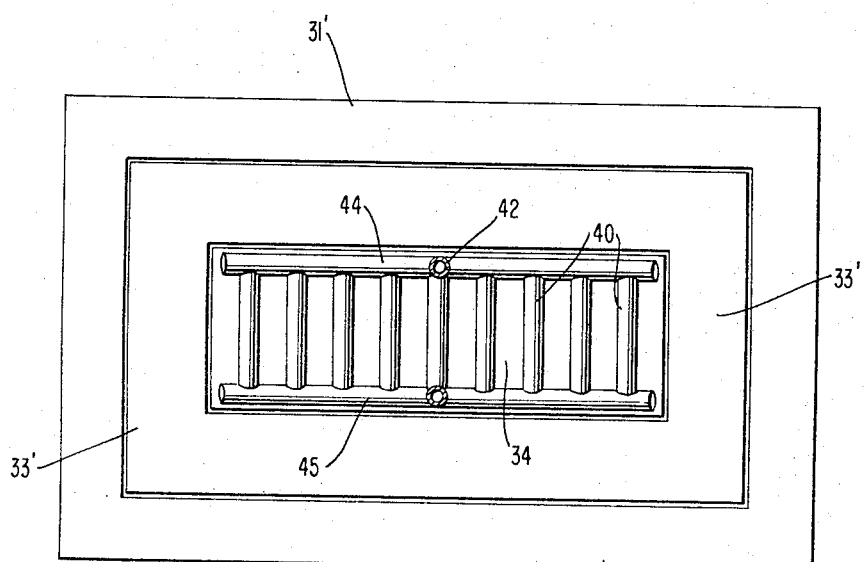
FIG. 4 is a plan view of the apparatus of FIG. 3.

In an additional development of the invention, the glass is tempered during its passage toward the flotation bath. In order to carry out this additional step, there is inserted in the furnace, in the position indicated by the break another chamber to contain the apparatus of FIGS. 3 and 4. These figures not only show the tempering of the plate but the formation of curved plates. According to this form of the invention, the bottom of the mold 31' has the same thickness as the mold cover 34. The side walls of the mold are composed of a ring 33'. Above and below the mold parts are vertically movable cooling frames 40 and 41 and pipes 42 and 43 which are supplied with non-oxidizing gas such as nitrogen or carbon dioxide which fills headers 44, 45 which are interconnected by a plurality of pipes 46 which have rows of perforations 47 directed toward the respective top or bottom of the mold.

The bottom of the mold has a concave curve and the cover has a corresponding convex curve. As illustrated, the curvature is comparable to that which is used in certain automobile windshields. As soon as the glass sheet has taken its final shape, the cooling gases are turned on above and below the mold and the cooling is continued vigorously until the glass has been temepered by its contact with the rapidly cooling top and bottom of the mold. In this state the glass can be removed immediately from the furnace and cooled to atmospheric temperature or, it can be transferred to the molten metal bath as indicated in FIG. 2. It is advisable to shape the mold and transfer the glass to the molten bath with the concave side down because the glass then makes contact with solid materials, during transference, only at its ends. It should be observed that this form of the invention can be applied to sheets of equilibrium thickness, the only function of the cover plate in that case being to impart a curvilinear shape to the glass.

This modification particularly concerns a variation in the solidification of the liquid glass in the interior of the mold which applies equally to a molded plane sheet and to a molded bent sheet and which eliminates the final leveling operation which was carried out on the faces of a molded sheet in the parent case. This modification has two essential points, in the first of which the surface of the bottom of the mold and the lower surface of the pressure plate have the same shape as the faces of the bent sheet which is to be produced from the liquid glass and, in the second of which the layer of liquid glass of uniform thickness at the end of the molding is held between the surfaces of the bottom and the cover of the mold while it is chilled with great speed to a solid state by symmetrically and uniformly chilling the contiguous parts of the mold.

The advantages of this form of the invention are that bent sheets can be made which are less than 6 mm. thick and may be used directly for automobile windshields or to make sandwich safety glass in which either or both of the glass layers may be tempered, these tempered layers being joined by a layer of plastic by ordinary process of manufacture; because of the rapid and uniform solidification of the liquid glass the bent sheets possess fire polish as they come from the mold. This can partly be explained by the rapidity with which the faces of the sheet pass through the deformation point and by the non-capillarity of the mold parts. The temper which is imparted is high and uniform because of the extremely high initial mobility of the glass. The tempering begins while it is still liquid, while as in ordinary tempering processes it is only at about the softening point, which is in the neighborhood of $10^{7.65}$ poises. By regulating the intensity of cooling above and below one can equalize the speeds of chilling of the faces of the sheet during solidification and prevent the deformation of the tempered sheet.

It is regarded as astonishing that it should be possible to obtain surface leveling and fire polishing at the relatively low temperatures of 700 to 800° C. so as to remove any defects imparted by the mold and other graphite surfaces. It is also an advantage of this invention that the successive bent plates are of identical shape and curvature and can be made into sandwich glass with a minimum of distortion. In general, the glass is at 500 to 600° C. when it is withdrawn from the leveling bath and 3 to 5 minutes on the leveling bath are sufficient to correct any imperfections imparted by the mold or the plate 21. The steps which follow the leveling bath are classical and need no description.

The advantages of the invention have been partly explained during the description. The objects of the invention have been attained, curved sheets of good fire polish have been made, a new type of tempered glass and a new tempering process have been made available, sheets of less than equilibrium thickness have been produced with a fire polish, and surface levelling and polishing by flotation and by combined mechanical molding and flotation methods have been introduced.

As many apparently widely different embodiments of the present invention may be made without departing from the spirit and scope thereof, it is to be understood that this invention is not limited to the specific embodiments.

What is claimed is:

1. A glass sheet of less than equilibrium thickness having a circumscribing rounded, fire-polished edge and fire-polished broad surfaces merging smoothly into said edge.

2. Curved flat glass of less than equilibrium thickness having circumferentially extending and transversely rounded fire-polished edges which are joined angularly to both curved faces and which merge smoothly into said faces.

3. Convex flat glass of less than equilibrium thickness having fire-polished surfaces and a continuous circumferential edge which is transversely rounded and fire-polished, and which merges smoothly into said fire-polished surfaces.

4. A method of making flat glass which comprises pouring liquid glass into a hot mold which is not wetted by the glass, in a nonoxidizing atmosphere, at fire-polishing temperature in an amount less than that required to cover the mold bottom at equilibrium, pressing the liquid glass with pressing means not wetted by glass until it just fills the bottom of the mold and is provided with a fire-polished and transversely rounded edge, cooling the pressing means rapidly until at least the broad faces of the flat glass are plastic, and transferring the plastic glass body to a molten metal surface in a nonoxidizing atmosphere for further treatment.

5. The method of claim 4 in which the mold bottom and the pressing means have cooperating faces one of which is concave and the other convex.

6. A method of making sheet glass to its final commercially saleable shape and thickness, which comprises shaping molten glass within a confining boundary of the desired shape of the sheet, by surface tension, gravity, and applied pressure, between nonwetting surfaces, until the sheet is formed with its edges in confined contact with said boundary, and tempering the glass by cooling it rapidly under the said applied pressure.

7. The method of claim 4 in which the glass body is maintained at plastic temperature on the molten metal surface until surface defects are eliminated.

8. The method of claim 7 in which the glass body is progressively reduced in temperature until it is below the deformation point, and is thereafter removed.

9. Mold means for shaping flat glass comprising a bottom, side walls, and a pressure plate, all of graphite, the pressure plate conforming to the shape of the sidewalls to fill smoothly within said side walls and being vertically movable therewithin, and means to rapidly cool said plate and said mold bottom.

10. Mold means according to claim 9 in which the bottom and side walls are interfitting, separable units.

11. Safety glass having a sheet of plastic adhesively attached to and between two sheets of tempered glass, each sheet of which is fire polished on its face and edge and of less than 6 mm. in thickness.

12. A method of making flat glass which comprises pouring glass at about $10^{2.5}$ to $10^{4.5}$ poises into a carbon mold under nonoxidizing atmosphere, compressing it beneath a carbon plate to a sheet of uniform thickness, reducing the viscosity to $10^{3.2}$ and $10^{3.75}$ poises, transferring the sheet to a molten metal bath at a temperature producing a viscosity between about $10^{6.5}$ and $10^{8.5}$ poises until surface defects vanish, and cooling the sheet.

13. A method of tempering sheet glass which comprises shaping a sheet from molten glass between forming surfaces which do not wet the glass, holding the molten glass sheet between the forming surfaces under light pressure until its surfaces are formed to desired shape and the sheet is of uniform thickness, rapidly chilling the formed surfaces and the sheet until the sheet is tempered, and removing the sheet.

14. A sheet of flat glass of less than equilibrium thickness having fire-polished surfaces and a continuous, transversely-rounded edge into which said surfaces merge smoothly, said sheet being made by depositing a predetermined volume of molten glass into a mold having a bottom and an upstanding continuous wall enclosing an area of said bottom of the desired size ad shape of the completed sheet, pressing the molten glass until the incipient sheet is of uniform thickness, with its edges in continuous contact with said unstanding walls, rapidly cooling the sheet while under pressure until at least its surfaces are plastic, and transferring the sheet while plastic, to the surface of a bath of molten metal and smoothing and fire-polishing the sheet thereon.

References Cited
UNITED STATES PATENTS

| | | | |
|---|---|---|---|
| 276,924 | 5/1883 | Swan | 65—26 |
| 1,670,111 | 5/1928 | Fraser | 65—93 |
| 1,812,565 | 6/1931 | Sloan | 65—72 |
| 3,223,501 | 12/1965 | Fredley et al. | |
| 3,241,937 | 3/1966 | Michalik et al. | 65—182 X |

DONALL H. SYLVESTER, *Primary Examiner.*

R. L. LINDSAY, *Assistant Examiner.*